Figure 1:
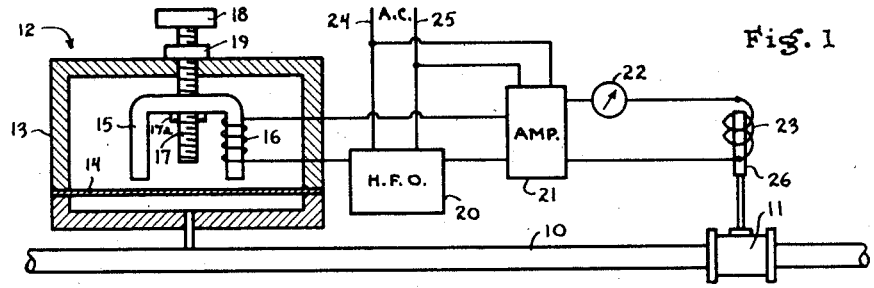

June 1, 1943.    A. B. NEWTON    2,320,881

CONTROL APPARATUS

Filed Aug. 3, 1940    2 Sheets-Sheet 1

INVENTOR.
Alwin B. Newton
BY George H Fisher
ATTORNEY

June 1, 1943.  A. B. NEWTON  2,320,881
CONTROL APPARATUS
Filed Aug. 3, 1940  2 Sheets-Sheet 2

INVENTOR
Alwin B. Newton
BY George H. Fisher
ATTORNEY

Patented June 1, 1943

2,320,881

UNITED STATES PATENT OFFICE 2,320,881

CONTROL APPARATUS

Alwin B. Newton, Minneapolis, Minn., assignor to Minneapolis-Honeywell Regulator Company, Minneapolis, Minn., a corporation of Delaware Application August 3, 1940, Serial No. 350,296

7 Claims. (Cl. 236—44)

This invention relates to control apparatus wherein condition responsive devices are employed to modulate a high frequency current.

An object of the invention is to provide a control system including a current responsive control device, and means to regulate the impedance of an electrical winding in circuit with said control device in accordance with the magnitude of a condition indicative of the need for operation of said control device.

Another object of the invention is to provide such a control system having means to regulate the sensitivity thereof.

A further object of the invention is to provide means by which the operating range of such a condition responsive system may be adjusted. A still further object is to provide means for adjusting the operating range from a remote point.

A further object of the invention is to provide means to modify the action of such a system in accordance with the magnitude of a second condition.

A further object of the invention is the provision of a device which regulates the impedance of an electrical winding in accordance with the algebraic sum of the magnitudes of a plurality of conditions.

A further object of the invention is to provide a system for operating a control device in accordance with the average of the magnitudes of a plurality of controlling conditions.

A further object of the invention is to provide a system for selectively operating one or more of a plurality of control devices in accordance with the magnitudes of one or more controlling conditions, wherein the control devices are located remotely from the condition responsive devices, and are connected thereto by a single pair of conductors.

I accomplish the objects set forth by providing an armature which is positioned relative to a magnetic core in accordance with the magnitude of a controlling condition. The reluctance of the air gap between armature and core determines the impedance of an electrical winding which is wound around the core. An alternating potential of high frequency is impressed across this winding, and the current flowing therethrough is employed to operate a current responsive control device.

The operating range of my condition responsive means may be regulated by varying the normal air-gap length either by manually adjusting the core or armature mounting means, or by passing a direct current through a winding about the magnet core, and thereby attracting the armature closer to the core. If a compensation of the action of my condition responsive means is desired, it may be secured by making the operating range adjusting means responsive to the condition to be compensated for.

The sensitivity of my condition responsive means may be changed by varying the frequency of the alternating potential employed. Since the inductive reactance of a winding varies directly with the frequency, the variation in reactance of the coil, for a given change in air gap length, is also proportional to the frequency. Hence, when a more sensitive device is required, a higher frequency may be employed.

In order to provide a device responsive to the algebraic sum of two conditions, the air gaps existing between the armature and the two ends of the magnetic core are made independently variable. The length of one air gap is varied in accordance with the magnitude of one condition and the length of the other air gap varied in accordance with the magnitude of the second condition. The reluctance of the magnetic circuit is then a measure of the algebraic sum of the two conditions.

The averaging of a plurality of controlling conditions may be obtained by connecting the windings of a plurality of my condition responsive devices in series with a single source of energy and a single control device. The control device thus becomes responsive to the sum of the impedances of the windings. Since the number of windings is constant, the average impedance is directly proportional to the sum, and the control device responds, in effect, to the average value of impedance.

Other objects and advantages of the present invention will be apparent from the following specification, claims, and drawings, of which:

Figure 1 is a somewhat diagrammatic sketch of a simple control system embodying my invention, showing one form of my condition responsive devices in cross section.

Figure 2:
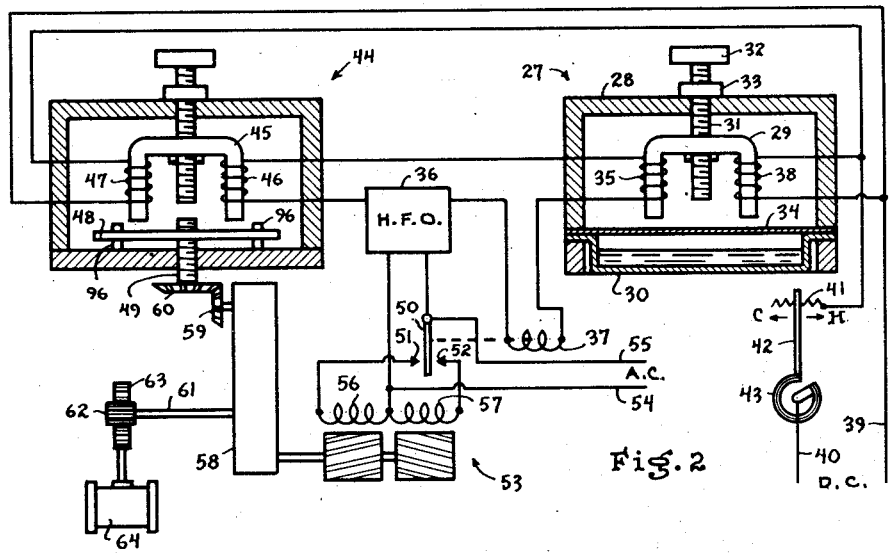
Figure 4:
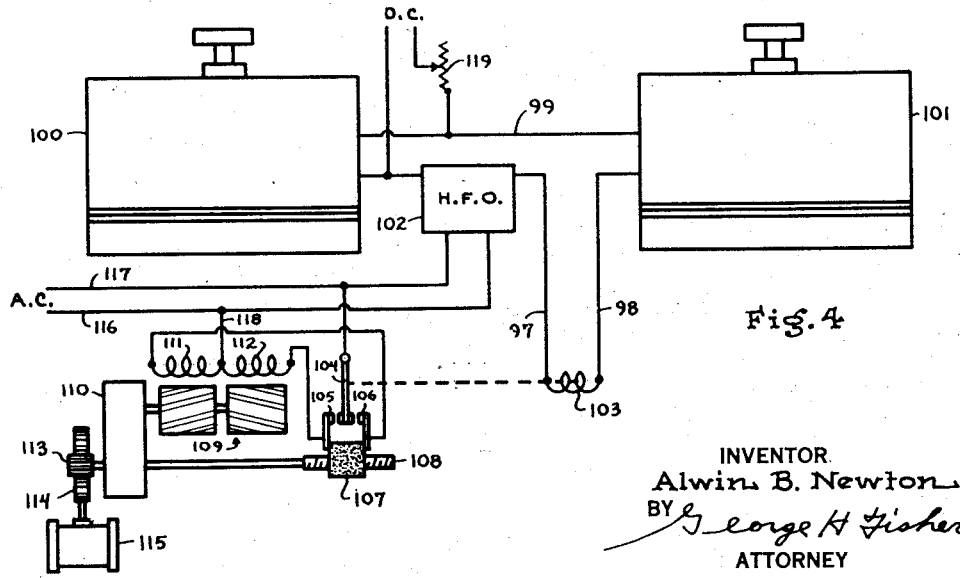
Figure 3:
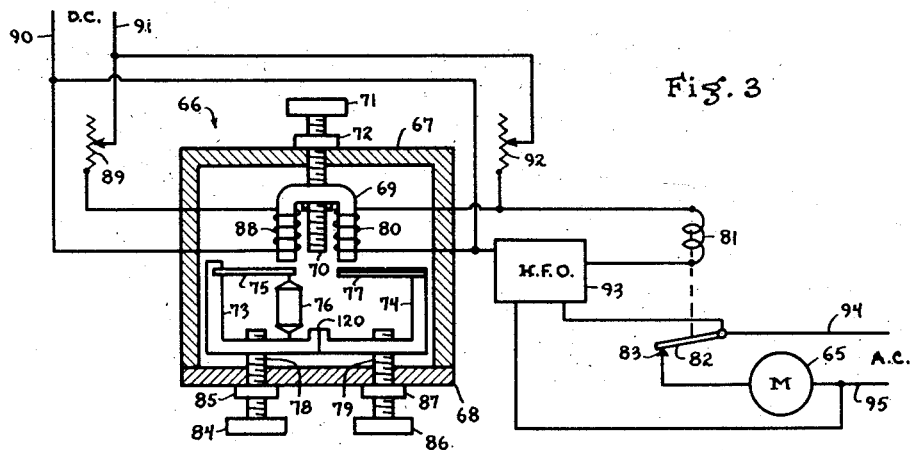
Figure 5:
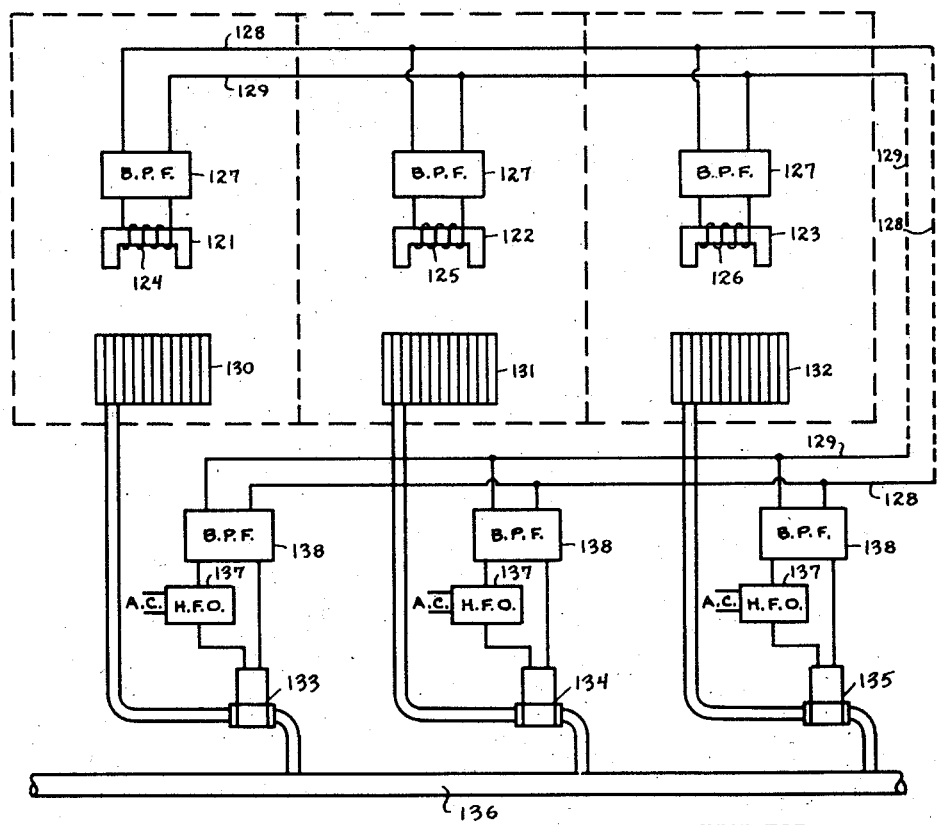

Figure 2 is a somewhat diagrammatic sketch of a different type of control system, showing in cross section other forms of my condition responsive device, Figure 3 is a somewhat diagrammatic sketch of a control system utilizing a form of my condition responsive device which responds to effective temperature, the latter being shown in cross section, and Figures 4 and 5 are wiring diagrams of different types of control systems embodying my invention.

In Figure 1 I have shown a system wherein the pressure in a pipe 10 is controlled by a valve 11, the opening of which is regulated by a condition responsive device indicated generally at 12. This device comprises a casing 13 which is separated into upper and lower compartments by a diaphragm 14. The pressure in the pipe 10 is communicated to the lower compartment and serves to regulate the position of the diaphragm 14. A magnetic core 15, about which is wound a coil 16, is supported within the upper compartment by a washer 17A, fixed on a bolt 17 which is threaded through the top of the casing 13. The core 15 is U-shaped, with the ends thereof extending downward adjacent the diaphragm 14. The bolt 17 is rotatable by a thumb piece 18 located at the outer end thereof and may be fastened in any desired position by means of a lock nut 19. Rotation of the bolt 17 serves to change the position of the ends of the core 15 with respect to the diaphragm 14 for purposes to be described later. Rotation of the magnetic core 15 on the bolt 17 may be prevented by any suitable means, not shown.

The coil 16 is connected in a circuit which includes a high frequency oscillator 20 and the input terminals of an amplifier 21. The output terminals of the amplifier 21 are connected to an ammeter or other suitable indicating device 22 and to a solenoid 23. The oscillator 20 and amplifier 21 are supplied with power through suitable connections from lines 24 and 25. The solenoid 23 is provided with a core 26 which is attached to the valve 11 and regulates the operation thereof.

If the pressure in the pipe 10 falls below the value which it is desired to maintain, the diaphragm 14 falls slightly, moving away from the magnetic core 15 and thereby decreasing the impedance of the coil 16. This allows a greater current to flow through the oscillator circuit to the amplifier input terminals. The amplifier output current flowing through the solenoid 23 is correspondingly increased, thereby causing the solenoid core 26 to be lifted, thus opening the valve 11 to a greater extent. On the other hand, if the pressure in the pipe 10 increases above the desired value the diaphragm 14 moves closer to the core 15, thereby increasing the impedance of coil 16 and decreasing the current in the oscillator and amplifier circuits and allowing the valve 11 to move toward its closed position. It is therefore apparent that this system acts to regulate the pressure in the pipe 10. The device may be adjusted to different values of pressure by turning the thumb piece 18, thereby changing the normal distance between diaphragm 14 and core 15 and setting the normal current through the solenoid 23.

*Figure 2*

In Figure 2 I have shown a temperature responsive control system embodying my invention.

The condition responsive device of this system, which is adapted to be placed in the room or space to be controlled, is shown generally at 27 and comprises a casing 28 in which is supported a magnetic core 29 and a temperature responsive member 30. The core 29 is supported by a washer fixed on a bolt 31 which is threaded through the top of casing 28 and is rotatable by means of a thumb piece 32. A locking nut 33 is provided to fasten the bolt in any desired position. On one leg of the core 29 is wound a coil 35 which is connected in circuit with a high frequency oscillator 36 and a relay winding 37. On the other leg of core 29 is a second coil 38 which is supplied with direct current from lines 39 and 40. The amount of current supplied to the winding 38 is regulated by a rheostat 41 whose movable contact 42 is positioned by a temperature responsive member 43.

The temperature responsive member 30 comprises a sealed metallic chamber whose upper surface 34 acts as an armature for cooperation with the magnetic core 29. The chamber 30 contains a suitable liquid in contact with its vapor. This liquid is preferably one having a vapor pressure characteristic such that the pressure within the chamber serves as a measure of the ambient temperature.

There is also provided in this system a rebalancing device 44 which is generally similar to the condition responsive device 27 and is provided with a magnetic core 45 having windings 46 and 47 on the legs thereof. An armature 48 is provided in the compensating device 44 for cooperation with the core 45. The armature 48 threadedly engages a shaft 49 and is positioned relative to the core 45 by the rotation of said shaft through means to be described later. Rotation of armature 48 with the shaft 49 is prevented by pins 96 rigidly attached to the base of said device 44 and extending upwardly through suitable apertures in the armature. The winding 46 of the rebalancing device 44 is connected in series with the winding 35 of temperature responsive device 27. The winding 47 of rebalancing device 44 is connected in parallel with the winding 38 of the temperature responsive device 27.

The relay winding 37 controls a switch arm 50 which moves between two contacts 51 and 52 to control the operation of a reversible motor indicated generally at 53. This motor 53 and the oscillator 36 are energized from lines 54 and 55. When the switch arm 50 engages contact 51 a circuit is completed from line 54 through a winding 56 of motor 53, contact 51, and switch arm 50 to line 55. Energization of winding 56 causes the motor to be rotated in a certain direction which may be, for example, clockwise. When the switch arm 50 engages contact 52 a circuit is completed from line 54 through winding 57 of motor 53, contact 52, and switch arm 50 to line 55. This winding operates to turn the motor in the opposite or counterclockwise direction. The motor 53 drives, through a reduction gear mechanism indicated schematically at 58, a beveled gear 59 which cooperates with a beveled gear 60 on the shaft 49. The motor 53 also drives, through a shaft 61 connected to the gear reducing mechanism 58, a pinion 62 which is in engagement with a rack 63 for operating a valve 64. The valve 64 controls the supply of heating fluid, for example, steam, to the room or space in which the temperature responsive device 27 is located.

When the temperature of the room or space being controlled falls below the desired value the vapor pressure in the chamber 30 is reduced and the armature 34 moves away from the core 29. This results in a decrease in the impedance of coil 35 and a consequent increase in the current flowing through the circuit thereof, which includes the relay winding 37. The switch arm 50 is thereby moved into engagement with the contact 52 thus energizing the winding 57 and causing rotation of motor 53. The direction of rotation of motor 53 is such as to open valve 64 thus increasing the supply of heat to the space being controlled. At the same time the shaft 49 is turned in such a direction as to move armature 48 closer to core 45 thereby increasing the impedance of winding 46. This action continues until the increase in the impedance of winding 46 has balanced the decrease in the impedance of winding 35 and thereby reduced the flow of current through the relay winding 37 to its normal value. The switch arm 50 is biased so that with normal current flowing through relay winding 37 the switch arm engages neither contact 51 nor 52.

If the temperature in the room or space being controlled rises above its predetermined value, armature 34 moves closer to core 29, increasing the impedance of winding 35, and decreasing the current through relay winding 37, thereby switch arm 50 to engage contact 51. This completes the energizing circuit for winding 56 of motor 53 which operates to close the valve 64 and to move armature 48 away from core 45. This action continues until the decrease in the impedance of winding 46 balances the increase in the impedance of winding 35.

The temperature responsive device 42 may be placed so as to be exposed to the outdoor temperature to increase the supply of heat to the room or space under control when the outdoor temperature falls. Such a fall in temperature causes the contact arm 42 to move as indicated by the legend in the drawing, counter-clockwise across the rheostat 41 thus increasing the resistance in the circuit of windings 38 and 47 and decreasing the current flow through those windings. This results in a decrease in the magnetic flux passing through the cores 29 and 45, with a consequent decrease in the impedance of coils 35 and 46. The flux decrease also reduces the attractive force between core 29 and armature 34, which thereupon moves slightly away from core 29, producing a further decrease in the impedance of coil 35. It is therefore apparent that a drop in outdoor temperature produces an effect on the system similar to that produced by a drop in temperature within the room or space under control. An increase in the outside temperature likewise produces an effect which simulates an increase in the temperature of the room being controlled. The normal temperature which the system is to maintain may be set by means of the thumb screw 32.

*Figure 3*

In Figure 3 I have shown a system for controlling the operation of a motor 65 in accordance with the effective temperature of a room or space. The motor 65 may be the driving motor for a compressor in an air conditioning system or some similar device.

A device 66, responsive to effective temperature, is used to control the motor 65. This device comprises a housing 67 and a base plate 68 secured thereto in any convenient manner. A magnetic core 69 is supported within the housing 67, being threadedly engaged with a bolt 70 which passes through the top of the housing 67. The position of the core 69 within the housing 67 may be varied by means of the thumb piece 71 and locking nut 72 which engage the bolt 70. Two brackets 73 and 74 are adjustably mounted within the housing 67 by bolts 78 and 79 threaded through the base plate 68 and the brackets 73 and 74, respectively. The brackets 73 and 74 are of magnetic material, and have slidable mating surfaces, as at 120, which are so proportioned as to engage each other, at least partially, even under extreme conditions of relative adjustment of the brackets. A spring steel bar 75 is attached at one end to the bracket 73 so that its free end is adjacent one end of the core 69. A web or other humidity responsive means 76 is stretched between the free end of bar 75 and the lower part of the bracket 73. As the humidity of the space in which the device is placed increases, the web becomes slack, allowing the free end of the bar 75 to move toward the adjacent end of the core 69. A temperature responsive member 77, shown as a bimetallic strip, is supported at one end by the bracket 74 and has its other end normally positioned near the other end of the core 69. An increase in the temperature to which the strip 77 is exposed will cause it to warp moving its free end nearer the core 69. The path of the magnetic flux which passes through the core 69 may be traced from one end of the core 69 across the air gap to the bar 75, through the bracket 73, the mating surfaces at 120, bracket 74, bimetallic member 77 and across the air gap to the other end of the core 69. It may therefore be seen that the total length of the air gaps in this magnetic circuit is proportional to the sum of the two conditions which determine the effective temperature, namely, the temperature and the humidity. The length of these air gaps regulates the impedance of a coil 80 around one leg of the core 69. This coil 80 is connected in series with a high frequency oscillator 93 and a solenoid 81 controlling a switch arm 82.

The motor 65 and the oscillator 93 are supplied with power from lines 94 and 95. The motor circuit may be traced from line 94, through switch arm 82, contact 83, and motor 65 to line 95.

When the effective temperature of the space being controlled increases above the value it is desired to maintain, the impedance of the coil 80 is increased, due to the movement of the condition responsive members 75 and 77. This decreases the current flow through the solenoid 81 and allows the switch arm 82 which is suitably biased to drop against the contact 83 thereby completing a circuit through the motor 65. Operation of the motor actuates the air conditioning system to reduce the effective temperature, whereupon the system energizes the solenoid 81 and the motor circuit is again opened.

The thumb screw 71 and the associated lock nut 72 serve to adjust the temperature and humidity responsive devices simultaneously. A similar thumb screw 84 and lock nut 85 are provided on the bolt 78 so that the humidity responsive member 76 may be adjusted independently. Another thumb screw 86 and lock nut 87 are provided on the bolt 79 for independent adjustment of the temperature responsive member 77.

In addition to these means for manually changing the adjustment of the device means are provided for adjustment of both the temperature and humidity responsive members from a plurality of remote locations. One means for remote adjustment comprises a coil 88 wound about the core 69. The amount of current flow through this coil is determined by a rheostat 89 which may be located at a remote point. A change in the current flowing through this circuit serves to change the magnetic flux through the core 69 and thereby changes the impedance of coil 80 and the attractive force between core 69 and the condition responsive members 75 and 77. A second means for remote adjustment comprises a rheostat 92 similar to rheostat 89 and connected to the coil 80 so as to superimpose a direct current upon the high frequency current supplied thereto by the oscillator 93. The effect of the direct current in the coil 80 is similar to that of the current in the coil 88. These circuits are supplied with direct current from lines 90 and 91.

It will be apparent to those skilled in the art that the compensating rheostat 41 of Figure 2, and that the adjusting rheostats 89 and 92 of Figure 3 are substantial equivalents, and that any one of them may be either manually adjusted or made automatically responsive to some condition for which compensation is required.

Figure 4

I have illustrated in Figure 4 a system wherein a plurality of condition responsive devices are used to control a valve 115 in accordance with the average magnitude of the conditions measured. Two condition responsive devices which are shown schematically at 100 and 101, may be of any of the types shown in Figures 1, 2, and 3. For example, they may be temperature responsive devices in a system wherein one such device is placed in each room of a building, and the average room temperature measured thereby is utilized to control the opening of the valve 116 in the main steam line of a boiler. Such a system is used to keep the steam line pressure just high enough to supply the demand for heat, so as to avoid the waste resulting from unnecessarily high steam line pressures. A follow-up action is provided in this system, so that the opening of the valve 15 is changed proportionally to a change in the average temperature.

The condition responsive devices 100 and 101 are provided with variable impedance windings which are connected in a series circuit with a high frequency oscillator 102 and a relay winding 103. This circuit, hereinafter termed the relay circuit, may be traced from oscillator 102 through a conductor 97, relay winding 103, a conductor 98, the coil of condition responsive device 101, a conductor 99, and the coil of condition responsive device 100, back to oscillator 102. The relay winding 103 operates a switch arm 104 between contacts 105 and 106 against suitable biasing means. Contacts 105 and 106 are mounted on a carriage 107, of insulating material, which moves along a threaded shaft 108 in accordance with the rotation thereof. The shaft 108 is rotated by a reversible motor 109 through a suitable gear reduction mechanism shown diagrammatically at 110. Motor 109 is provided with two windings 111 and 112, which may be selectively energized to drive the motor in either direction. The motor 109 also drives, through a suitable connection with the gear reduction mechanism 110, a pinion 113 which cooperates with a rack 114 to position the valve 115.

The motor windings 111 and 112 and the oscillator 102 are supplied with energy from lines 116 and 117. The circuit for energizing winding 111 may be traced from line 116, through a conductor 118, winding 111, contact 106, and switch arm 104 to line 117. The circuit for energizing winding 112 may be traced from line 116 through conductor 118, winding 112, contact 105, and switch arm 104 to line 117.

The current flowing through the relay circuit is inversely proportional to the sum of the impedances of the coils in the devices 100 and 101. Since the number of coils is constant for any given system, this current may be used as a measure of the average value of the temperatures to which the devices 100 and 101 are exposed.

When the average temperature falls below the value which the system is adjusted to maintain, a decrease in the impedance of the relay circuit results, with a consequent increase in the current flowing therein. The greater current flowing in the relay winding 103 causes the latter to move the switch arm 104 to the right, engaging the contact 106, and thereby completing the energizing circuit for motor winding 111. Energization of winding 111 causes rotation of motor 109 in such a direction that pinion 113 is rotated so as to open valve 115, and shaft 108 is rotated so as to drive carriage 107 to the right. This action continues until carriage 107 is driven far enough to separate contact 106 from switch arm 104.

On the other hand, if the average temperature rises above the desired value, the relay circuit impedance is increased, and the current flowing therethrough is decreased. This weakens the attractive force of relay winding 103, and the biasing means becomes effective to move switch arm 104 against contact 105, thereby completing the energizing circuit for motor winding 112. Energization of winding 112 causes rotation of motor 109 in such a direction that pinion 113 is rotated so as to close valve 115, and shaft 108 is rotated so as to drive carriage 107 to the left. This action continues until contact 105 is separated from switch arm 104.

It should be apparent to those skilled in the art, in view of the foregoing description, that the switch arm 104 is positioned in accordance with the average temperature measured by the devices 100 and 101. That is to say, for any value of average temperature within the operating range of the system, the switch arm 104 is moved to a definite position. By virtue of the follow-up mechanism operated by the motor 109, the valve 115 follows the motion of switch arm 104, so that the valve, also, is positioned in accordance with the average temperature.

The position of the valve 115 for any given value of average temperature may be changed by adjusting the thumb piece on the condition responsive devices 100 and 101. Remote adjustment of the valve position is accomplished by means of a rheostat 119 through which direct current is supplied to the relay circuit. The operation of this rheostat is similar to that of rheostat 92 described in connection with Figure 3.

Figure 5

In Figure 5 I have shown a system wherein a plurality of condition responsive devices are located remotely from a plurality of devices to be selectively controlled thereby and wherein all the condition responsive devices are connected to the control devices through one pair of conductors.

The condition responsive devices are shown diagrammatically in Figure 5 as three magnetic cores 121, 122, and 123 provided with coils numbered 124, 125, and 126, respectively. Each coil is connected through a band-pass filter shown diagrammatically in the drawing at 127 to a pair of conductors 128 and 129. The condition responsive devices are located in separate heating zones to which heat is supplied by the respective radiators 130, 131, and 132. The supply of steam to these radiators is controlled by valves 133, 134, and 135, respectively. Each of these valves is connected in a branch steam line between its associated radiator and a main steam line 136. These valves are preferably of the solenoid operated type and each solenoid is connected in series with a high frequency oscillator 137 and with the input terminals of a band-pass filter 138. The frequency of each of the oscillators is adjusted at a different value and the band-pass filter associated with each oscillator is designed to pass only current of that frequency. Similarly the band-pass filter 127 associated with each condition responsive device is designed to pass only current of the frequency associated with the corresponding control device. It may therefore be seen that each condition responsive device may operate its own particular control device without interference from any of the other condition responsive devices and that by using this system it is only necessary to use one pair of conductors between the group of condition responsive devices and the group of control devices.

While I have shown several specific embodiments of my invention it will be understood that this is for purposes of illustration only and that my invention is to be limited only by the scope of the appended claims.

I claim as my invention:

1. A system for operating a control device including in combination, a source of alternating electrical energy, an impedance having a core of magnetic material and a coil about said core, an armature cooperating with said core, means for regulating the distance between said armature and said core in accordance with the magnitude of a condition indicative of the need for operation of said control device, a connection between said source of energy and said control device including said coil, a source of direct current connected to said coil, and means for controlling the flow of direct current through said coil.

2. A system for operating a control device including in combination, a source of alternating electrical energy, an impedance having a core of magnetic material and a coil about said core, an armature cooperating with said core, means for regulating the distance between said armature and said core in accordance with the magnitude of a condition indicative of the need for operation of said control device, a connection between said source of energy and said control device including said coil, a second coil about said core, a source of direct current connected to said second coil, and means for controlling the flow of direct current through said second coil.

3. A system for operating a control device including in combination, a source of alternating electrical energy, an impedance having a core of magnetic material and a coil about said core, an armature cooperating with said core, means for regulating the distance between said armature and said core in accordance with the magnitude of a condition indicative of the need for operation of said control device, a connection between said source of energy and said control device including said coil, a source of direct current, a connection between said coil and said direct current source, means for controlling the flow of current through said connection, a second coil about said core, a connection between said second coil and said direct current source, and means for controlling the flow of current through said last mentioned connection.

4. A system for operating a current responsive control device in accordance with the effective temperature of a space to be controlled, including in combination, a source of alternating electrical energy, an impedance having a core of magnetic material and a coil about said core, an armature having its ends adjacent the ends of said core, means for regulating the distance between one end of said armature and the adjacent core end in accordance with the temperature of the space to be controlled, means for regulating the distance between the other end of said armature and the corresponding core end in accordance with the humidity of the space to be controlled and a connection between said source of energy and said control device including said coil.

5. A system for operating a current responsive control device including in combination, an oscillator for providing alternating electrical energy of high frequency, an impedance having a core of magnetic material and a coil about said core, an armature cooperating with said core, means for regulating the distance between said armature and said core in accordance with the magnitude of a condition indicative of the need for operation of said control device, a circuit path for the output of said oscillator including said coil and said control device, and means for varying the saturation of said core independently of the magnitude of said condition.

6. A system for operating a current responsive control device including in combination, an oscillator for providing alternating electrical energy of high frequency, an impedance having a core of magnetic material and a coil about said core, an armature cooperating with said core, means for regulating the distance between said armature and said core in accordance with the magnitude of a condition indicative of the need for operation of said control device, a circuit path for the output of said oscillator including said coil and said control device, whereby variations in the impedance of said coil cause operation of said control device, and means operated concurrently with said control device for varying the impedance of said circuit in a sense opposite to that of the variations causing operation of said control device.

7. A system for modulatingly positioning a control device in accordance with the value of a variable condition, comprising in combination, a source of alternating electrical energy, first variable impedance means including a core of magnetic material, a coil wound on said core, an armature cooperating with said core, and means for regulating the distance between said armature and said core in accordance with said variable condition, circuit means including said source and said first variable impedance means, a motor for driving said control device, means responsive to an electrical current flowing in said circuit means for controlling said motor, second variable impedance means in said circuit, and a connection between said motor and said second variable impedance means for varying said second impedance means in a sense opposite to that of the variation of said first impedance means which caused operation of said motor.

ALWIN B. NEWTON.